United States Patent
Slyz et al.

(10) Patent No.: US 8,201,054 B2
(45) Date of Patent: Jun. 12, 2012

(54) FAULT-TOLERANT METHOD AND APPARATUS FOR UPDATING COMPRESSED READ-ONLY FILE SYSTEMS

(75) Inventors: Marko Slyz, San Diego, CA (US); LaShawn McGhee, San Diego, CA (US); Zhao-Ming Wu, Beijing (CN); Li Wen, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 12/509,184

(22) Filed: Jul. 24, 2009

(65) Prior Publication Data

US 2010/0325523 A1 Dec. 23, 2010

(30) Foreign Application Priority Data

Jun. 19, 2009 (CN) .......................... 2009 1 0150544

(51) Int. Cl.
*G11C 29/00* (2006.01)
(52) U.S. Cl. ......... 714/773; 711/118; 711/154; 717/168
(58) Field of Classification Search .................. 714/773; 717/168; 711/118, 154
See application file for complete search history.

(56) References Cited

U.S. PATENT DOCUMENTS

| | | | |
|---|---|---|---|
| 6,209,088 | B1 | 3/2001 | Reneris |
| 6,266,736 | B1 | 7/2001 | Atkinson et al. |
| 6,377,958 | B1 | 4/2002 | Orcutt |
| 6,732,221 | B2 | 5/2004 | Ban |
| 6,816,944 | B2 | 11/2004 | Peng |
| 6,925,467 | B2 | 8/2005 | Gu et al. |
| 7,487,303 | B2 | 2/2009 | Song et al. |
| 2008/0294813 | A1 | 11/2008 | Gorobets |
| 2009/0007090 | A1 | 1/2009 | Hirao et al. |

*Primary Examiner* — Sam Rizk

(57) ABSTRACT

A fault-tolerant approach for updating a compressed read-only file system in embedded devices using a two-step approach. In the first phase an update package creates an intermediate memory image where the data blocks are independently compressed so that, if needed, the data therein can be decompressed and read without access to any other surrounding data blocks. Then in the second phase the intermediate memory image is decompressed in a buffer so that it can be reimaged into its final form and order before being recompressed and written back to non-volatile memory over-writing the intermediate memory image.

9 Claims, 12 Drawing Sheets

FAULT-TOLERANT METHOD AND APPARATUS FOR UPDATING COMPRESSED READ-ONLY FILE SYSTEMS

RELATED APPLICATIONS

The present application is related to United States Patent Application Ser. No. 60/933,608, entitled "BINARY-LEVEL UPDATE OF COMPRESSED READ-ONLY FILE SYSTEMS," filed Jun. 6, 2007, and to United States Patent Application Serial No. PCT/US2008/066,167 entitled "BINARY-LEVEL UPDATE OF COMPRESSED READ-ONLY FILE SYSTEMS," filed Jun. 6, 2008, which is hereby incorporated herein by reference in its entirety.

BACKGROUND OF THE INVENTION

The present invention relates generally to techniques for updating software stored in electronic devices having non-volatile memory, and more particularly to fault-tolerant methods and systems supporting the processing of updates of firmware, software, configuration parameters and file systems in memory of an electronic device such as, for example, non-volatile flash-type memory.

Embedded electronic devices sometimes have file systems that are stored in flash-type non-volatile ("flash") memory, such as EEPROMs. And these file systems are quite often configured as compressed read-only file systems for optimal use of the flash memory. The files, executables and other types of data, are generally decompressed and loaded into RAM for reference or execution by the host system. It can be very useful to periodically update the data in these stored file systems to, for example, upgrade current software for added functionality or to simply fix bugs in the software code. And such software upgrades or bug fixes are commonly sent over wireless connections or through wired-internet connections.

An original version of a file system is referred to herein as V1 (or version 1) and the updated version as V2 (or version 2). In some cases, much of V2 is similar or identical to V1. In this situation, an update may be done by sending just the information that has changed between V1 and V2. A tool that is referred to herein as a "generator" accepts V1 and V2 as inputs, and produces information used in the electronic device to convert or transform version V1 into version V2. This information may be stored in a file referred to herein as an update package (UP), which may be sent to all of the embedded electronic devices that are to be updated. Each of these electronic devices contains a program referred to herein as an "update agent," which applies the UP to version V1, thus converting V1 to produce version V2.

The most direct type of software update is to create the new version of each changed flash block in a buffer (RAM), and then to write that data to its final location in non-volatile memory. Often times data in the updated version of a block of data depends on the data in its original version. This can cause a problem if the power dies while the updated data is being written in the non-volatile memory, since then the updated version in the buffer is gone, and the original data that is required to create the new data blocks may be corrupted. Once the device is corrupted, the user is often faced with the need to physically take the device to a service center where the memory can be erased and completely reimaged.

While the following discussion focuses primarily on mobile electronic devices such as, for example, mobile handsets, cellular phones, personal digital assistants (PDA), MP3 players, pagers, and handheld personal computers, this is by way of example and not by way of specific limitations. The teachings contained herein may also be applicable to a variety of other electronic devices having a processor and non-volatile memory containing software, firmware, configuration information, data files, and the like, for which updating of the memory contents may be desirable.

Further limitations and disadvantages of conventional and traditional approaches will become apparent to one skilled in the art, through comparison of such systems with a representative embodiment of the present invention as set forth in the remainder of the present application with reference to the drawings.

DETAILED DESCRIPTION

Figure 1A:
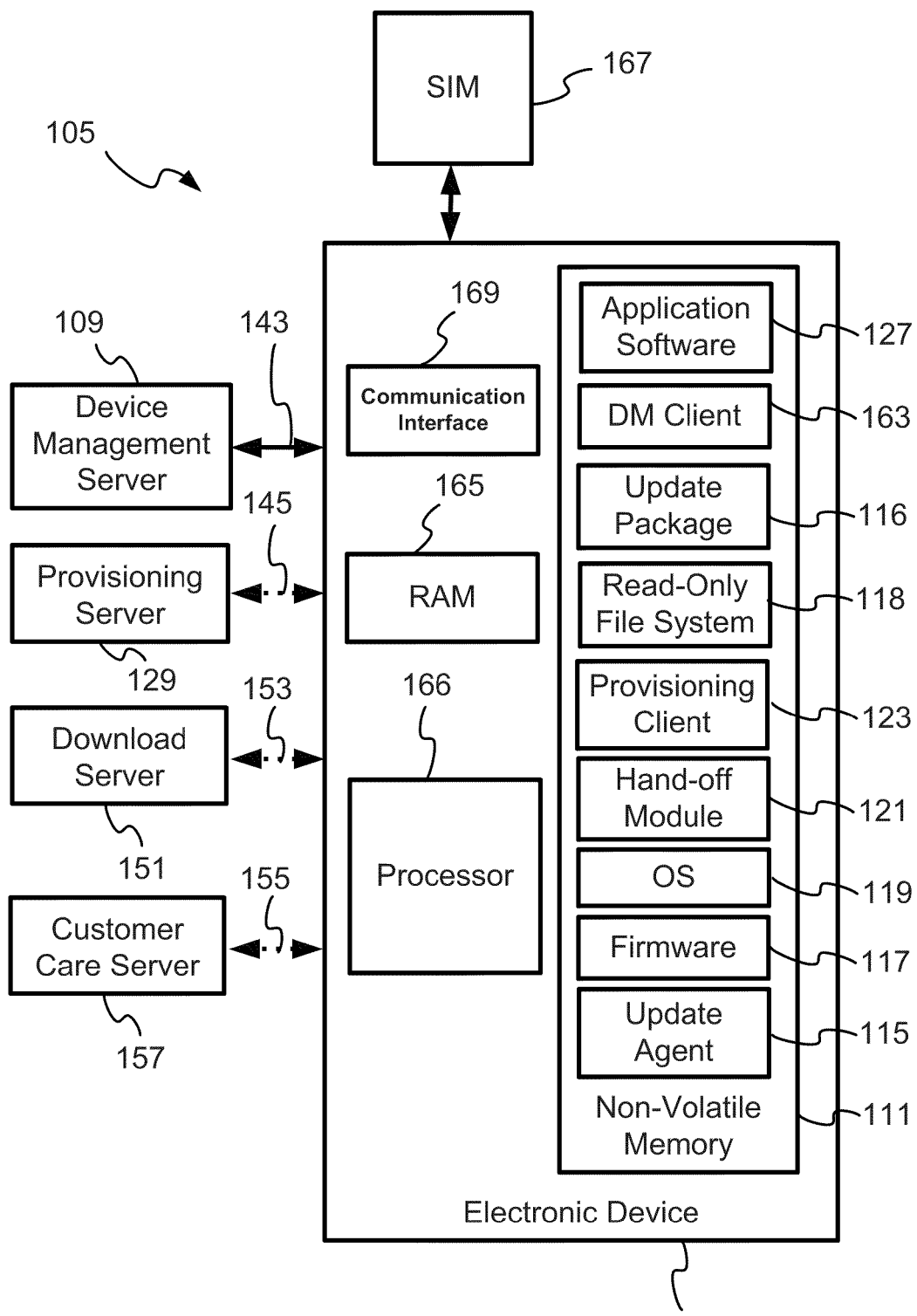
FIG. 1A is a perspective block diagram of an exemplary network that supports remote update of non-volatile memory of an electronic device such as, for example, a mobile handset or personal digital assistant, in accordance with a representative embodiment of the present invention.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as Wi-Fi, IEEE 802.11a/b/g/n compatible networks, the short range wireless technology known as Bluetooth, and similar types of communication links.

Information for updating memory in an electronic device such as those described above is communicated using an update package comprising a set of instructions executable by firmware and/or software in the electronic device to transform or convert an existing version of software, firmware, and/or data in the electronic device into a new or updated version of the software, firmware, and/or data. In some representative embodiments, such an update package also contains metadata related to the update.

In an exemplary embodiment we use an update method that is commonly referred to as "delta compression" to perform updates. The update package 116 in FIG. 1 comprises a sequence of instructions generated by a "generator" that are used by an "update agent" in electronic device 107 to recreate an updated version of the memory contents by converting or transforming version V1 to version V2. A number of different types of instructions may be contained in the update package. One instruction type is the "copy" instruction, which moves identical bytes from original version V1 into the updated version V2. For example, if a sequence of 10,000 consecutive bytes is common to both version V1 and version V2, then the generator can issue a single copy instruction, just a few bytes long, to move all 10,000 bytes into version V2. Other types of instructions may be used to explicitly list what bytes to insert into version V2. The generator can use these other types of instructions for material that cannot be efficiently encoded using the copy command. For example, short sequences of bytes may be more efficiently encoded by sending them verbatim because of the overhead involved with the use of the copy instruction.

Flash-type memory (where V1 and later V2 may be permanently stored) is a rewritable non-volatile memory typically organized into blocks of data, which for some types of flash memory may be the smallest writable unit of data. For some types of flash memory, blocks are also the smallest readable unit of data and generally must be written to in their entirety. Because of this, updating flash memory consists of writing blocks of data one flash block at a time as is discussed in greater detail below.

The generator determines the order in which to update flash memory blocks. Ideally the generator determines the best ordering so that the agent updates a flash block only after the material in it is no longer needed for anything else in V2. This is not always possible, so compromises, as decided by what is called an order manager, are often required to determine an optimal order for a particular version V1 and version V2.

Another function of the generator is to produce update packages having a minimal number of bytes, because transmission time/bandwidth is often limited, and an end-user may be waiting for an update to complete. Obviously the larger the update package, the longer the transmission time will be to download the update. The generator and the update agent together must support fault-tolerance, so that the electronic device recovers gracefully and without corruption of the memory contents if the update process is unexpectedly interrupted. Since the reliability of the electronic device is totally dependent on the operating system code, it is imperative that updating processes be fault-tolerant so as not to corrupt the contents of the memory during an update of the file. Otherwise the host system may not work without a complete re-imaging of the underlying operating system code. This is not a desirable event.

For example, if the power source or battery in an electronic device being upgraded is interrupted or exhausted while the update agent is in the updating process of writing version V2 to flash memory, then the part of version V1 that the update agent overwrote will no longer be available when the user eventually restores power or recharges the battery and resumes the update process. Because, in a naïve system, this part of version V1 may have been needed by the update agent to create version V2 from version V1 and the update package, in the case of a read-only file system, there may be no way in the prior art to continue the update process without some form of file corruption. One example of a read-only file system is "squashfs" created by Phillip Lougher (see http://squashfs-.sourceforge.net/). A file corruption may not only corrupt memory cells, but may also cause the electronic device itself to be left in an unusable state. However, a generator in accordance with the present invention compensates for such a lack of V1 availability. For example, if the generator detects that a part of version V1 is not available at a particular time during the update process, the order manager may compensate by arranging for the unavailable material to be not referenced.

FIG. 1A is a perspective block diagram of an exemplary network 105 that supports remote update of non-volatile memory within a host system (electronic device 107) such as, for example, a mobile handset or a PDA. Electronic device 107 can support a number of features and/or applications that may contain software/firmware errors that need to be corrected, or that may provide additional features/benefits by updating the software/firmware. Electronic device 107 can be used to request updates to software/firmware via a customer care server 157 either directly, using a browser in the electronic device 107, or via a customer service representative (CSR) not shown. A CSR may provide service to the customer using electronic device 107 by retrieving, as necessary, one or more diagnostic management objects (MOs) stored in memory of the electronic device 107, and by transmitting to the electronic device 107 from a remote server, update information in the form of, for example, one or more UPs. Such update packages comprise instructions executed/interpreted by software/firmware code in electronic device 107 that convert or transform a first version of software/firmware to a second version of software/firmware, in electronic device 107. In some embodiments, the update package(s) also contain metadata and preferably checksum information.

As shown in FIG. 1A, network 105 comprises the electronic device 107, a device management (DM) server 109, a provisioning server 129, a customer care server 157, and a download server 151. Although not illustrated in FIG. 1A, the present invention may also comprise other application servers such as, for example, a diagnostics server, and a self-care website/portal. Electronic device 107 is able to communicate with the DM server 109, Download Server 151, Customer Care Server 157, and the Provisioning Server 129 via a communication interface 169, and communication paths 143, 153, 155, and 145, respectively. Although communication paths 143, 153, 155, 145 are illustrated generally in FIG. 1A as being separate paths between the device and their respective servers, this is only for purpose of illustration. Communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities. While not explicitly shown in FIG. 1A, one of ordinary skill in the relevant art will recognize that communication interface 169 is compatible with the selected type(s) of communication paths 143, 153, 155, 145.

As also illustrated in FIG. 1A, Electronic Device 107 comprises processor 166, random access memory (RAM) 165, and non-volatile memory (NVM) 111. NVM 111 may comprise, for example, NAND- or NOR-type flash memory or other suitable type of NVM. NVM 111 may contain a number of software/firmware code components of electronic device 107 including, for example, application software 127, a device management (DM) client 163, an update package/update-package array 116, a read-only file system (ROFS) 118, a provisioning client 123, a hand-off module 121, an operating system (OS) 119, firmware 117, and one or more update agent(s) 115. Additional software/firmware code components may also be present in RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. Electronic device 107 may also comprise interface circuitry (not shown) to enable operable connection of a subscriber identity module (SIM) card 167, that may be employed in accordance with aspects of the present invention described later in this document.

Electronic device 107 of FIG. 1A processes an update package (e.g., the update package array 116) delivered by a remote server such as, download server 151, to update firmware/software, data and configuration information in memory of electronic device 107. Such an update package comprises update information including, for example, metadata describing an update, checksums, and instructions executable by one or more update agents, e.g., update agent 115 of FIG. 1A. Update agent 115 processes a set of executable instructions, which are used as a compact means to encode differences between an existing/first version V1 and updated/second version V2 of firmware, software, data, and/or configuration parameters in electronic device 107. The executable instructions may be assembled into one or more update packages to be transmitted to the device for use in updating memory 111. One or more update agent(s) 115 in the device process respective portions of the executable instructions from an update package. Electronic device 107 may also receive provisioning information from, for example, the device management server 109, the customer care server 157, and/or the provisioning server 129 to fix configuration problems or reconfigure software and hardware.

In addition to those elements described above, electronic device 107 may comprise a downloaded diagnostic client (not shown) that facilitates remote diagnosis, and a traps client (not shown) that facilitates the setting of traps and retrieving of collected information. In such embodiments DM client 163 interacts with DM server 109, the diagnostic client, and/or the traps client, to receive DM commands from DM server 109 and to implement them in device 107. Download server 151 is employed to download firmware and software updates (e.g., update information in the form of update packages). The download server 151 may also be used to download new firmware/software such as, for example, the diagnostics client mentioned above, which can then be installed and activated in electronic device 107.

As described briefly above in connection with FIG. 1A, electronic device 107 receives update information (e.g., as an update package) for processing by one or more update agents (e.g., update agent 115) to convert/transform the software (e.g., application software 127) and/or firmware (e.g., firmware 117) to produce updated software/firmware in the electronic device. Each of the update agents are appropriately arranged to process different types of update information for updating different types/formats of software, firmware, user data, and configuration parameters in the memory of electronic device 107. In such an embodiment, each of the update packages received can be processed in the device 107 by an appropriate one of the update agent(s) 115 to update an associated type of information in memory 111.

Ordinary file systems have the ability to create, modify, and delete individual files. This makes updating files relatively straightforward, since the update agent 115 can modify one file at a time, without regard for the other files. Some file systems, however, are "read-only" files systems (ROFS), meaning that they do not easily allow for individual files to be added, deleted, or modified (and hence the name "read only"). These file systems are useful for storing files (e.g., system files in an OS) that do not need to be updated very often. Furthermore, read-only file systems are often organized in the most compact way possible, with the use of simplified data structures and compression. And, in general, there may be no way to add for example 100 bytes to the end a file without moving the files that follow it.

Figure 1B:
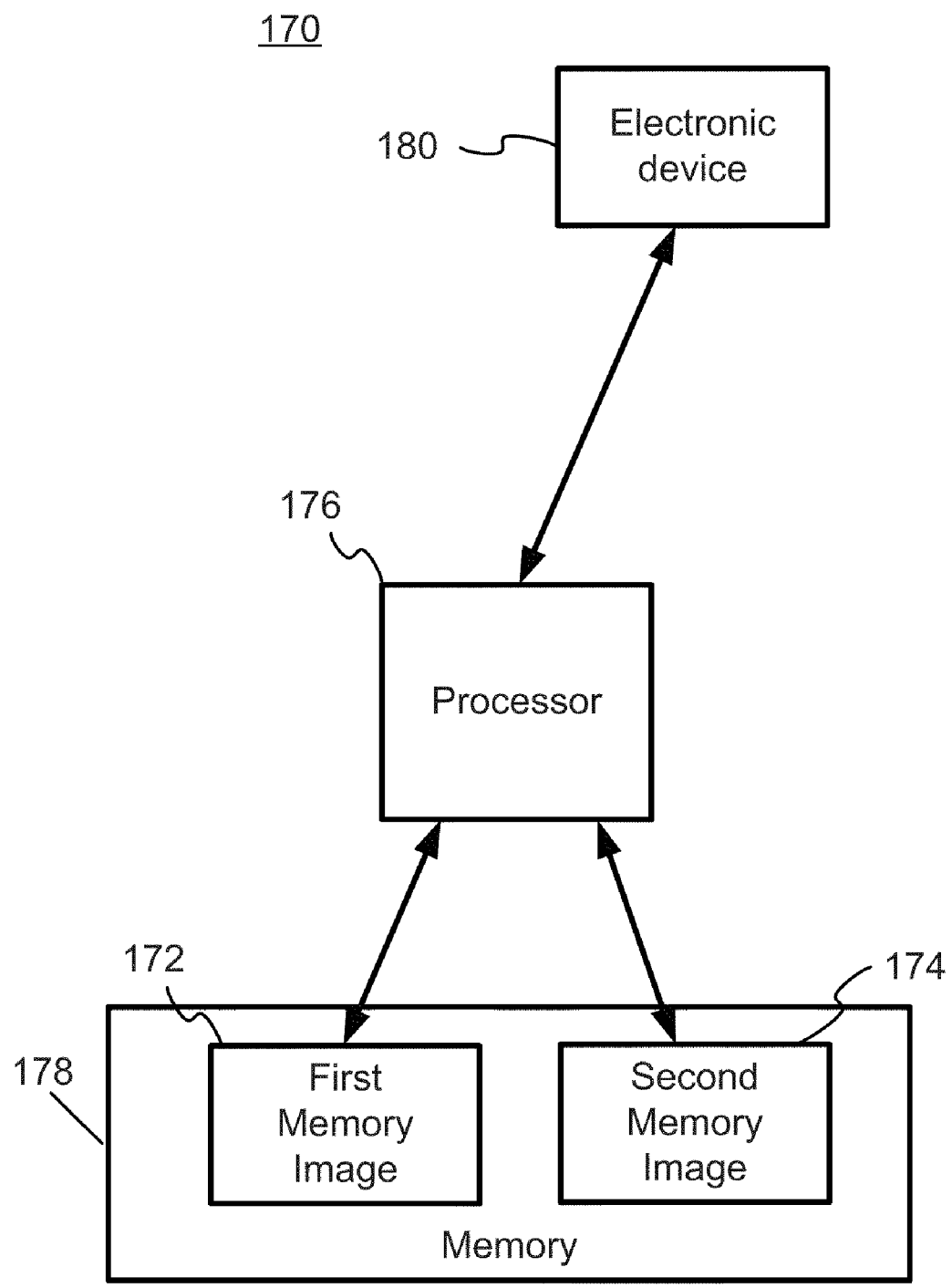
FIG. 1B is a perspective block diagram of an exemplary computer system comprising a processor that accesses a first memory image to produce a second memory image arranged as a plurality of independently decompressible memory blocks for storage in the memory of an electronic device that may correspond to, for example, the electronic device of FIG. 1A, in accordance with a representative embodiment of the present invention.

FIG. 1B is a perspective block diagram of an exemplary computer system 170 comprising a processor 176 that accesses a first memory image 172 to produce a second memory image 174 arranged as a plurality of independently decompressible memory blocks for storage in the memory of electronic device 180 that may correspond to, for example, the electronic device 107 of FIG. 1A. FIG. 1B shows a first memory image 172 that may be a memory image produced by, for example, a manufacturer of electronic device 107, or a third-party software developer. The first memory image 172 may contain firmware and/or a read-only file system. The first memory image 172 is a copy of non-volatile memory of an electronic device such as, for example, the NVM 111 of electronic device 107 of FIG. 1A. Updating of the first memory image 172 using, for example, a device management server, such as DM server 109 of FIG. 1A, may be enabled by processing the first memory image 172 to produce a second memory image 174 arranged as a plurality of memory blocks that are de-compressible. The term "independently decompressible" is used herein to mean that the data in a particular memory block may be decompressed without decompressing data from another memory block. The current or original version V1 of a memory image produced in this manner may be processed along with a second or updated version of the memory image by a software tool known as a generator to produce update information for updating the contents of memory in an electronic device such as the electronic device 107 of FIG. 1A. Details of a process that uses a first memory image to produce such a second memory image are provided below.

Figure 2A:
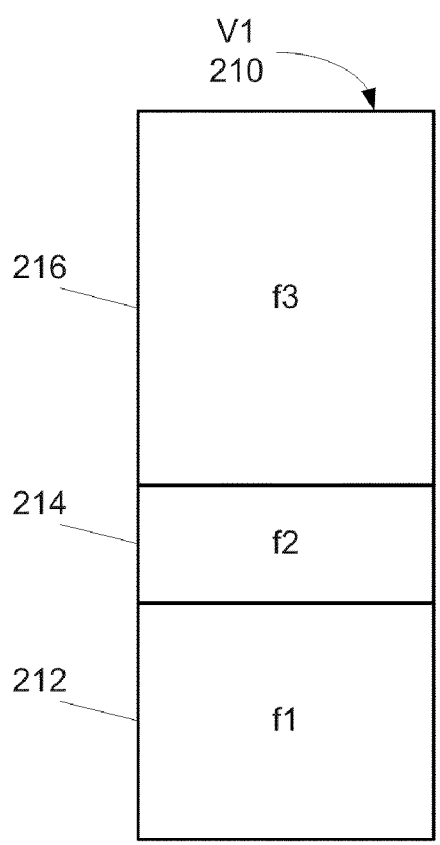
FIG. 2A and 2B are block diagrams illustrating an exemplary compressed flash memory block in 2A, and a decompressed version in 2B, in accordance with a representative embodiment of the present invention.
Figure 2B:
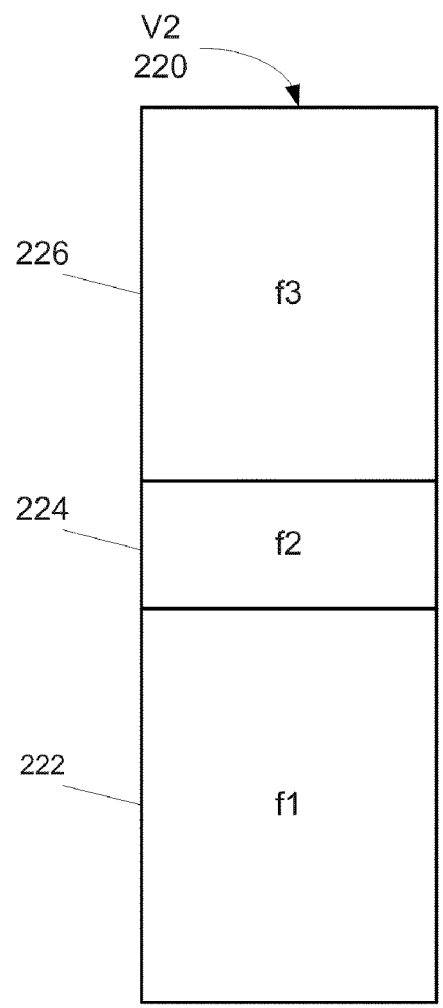

FIGS. 2A and 2B are block diagrams of an exemplary file system arrangement. FIG. 2A illustrates an "original" version V1 210 of a file system with three files f1 (212), f2 (214), and f3 (216), while FIG. 2B illustrates an exemplary "new" version V2 (220) of the file system. As illustrated in these figures, the f2 files (214 and 224) and the f3 files (216 and 226) are unchanged from V1 to V2, except the location of f2 and f3 are moved up (as shown in FIG. 2B) in memory to accommodate the data bytes added to the end of the f1 file (212) shown as 222 in V2.

The most direct approach for updating a read-only file system is to have the update agent create an entirely new file system image holding all of the files in version V2, and then writing it to, for example, flash memory 111 in FIG. 1A. This can be overly time consuming, particularly if only a small part of the file system has changed, but more importantly this is often not possible in cases of limited flash memory capacity or even limited RAM capacity. Although the RAM 165 is often available to temporarily hold a completely new file image, it cannot be used for this purpose, since its contents would be wiped out during a power failure. (The US Patent Application referenced above, Serial No. PCT/US2008/066,167 and filed Jun. 6, 2008, describes a fault-tolerant method for handling compressed ROFS that requires the device to specially prepare the images. The invention described herein represents an alternative to that system and method.)

Figure 3:
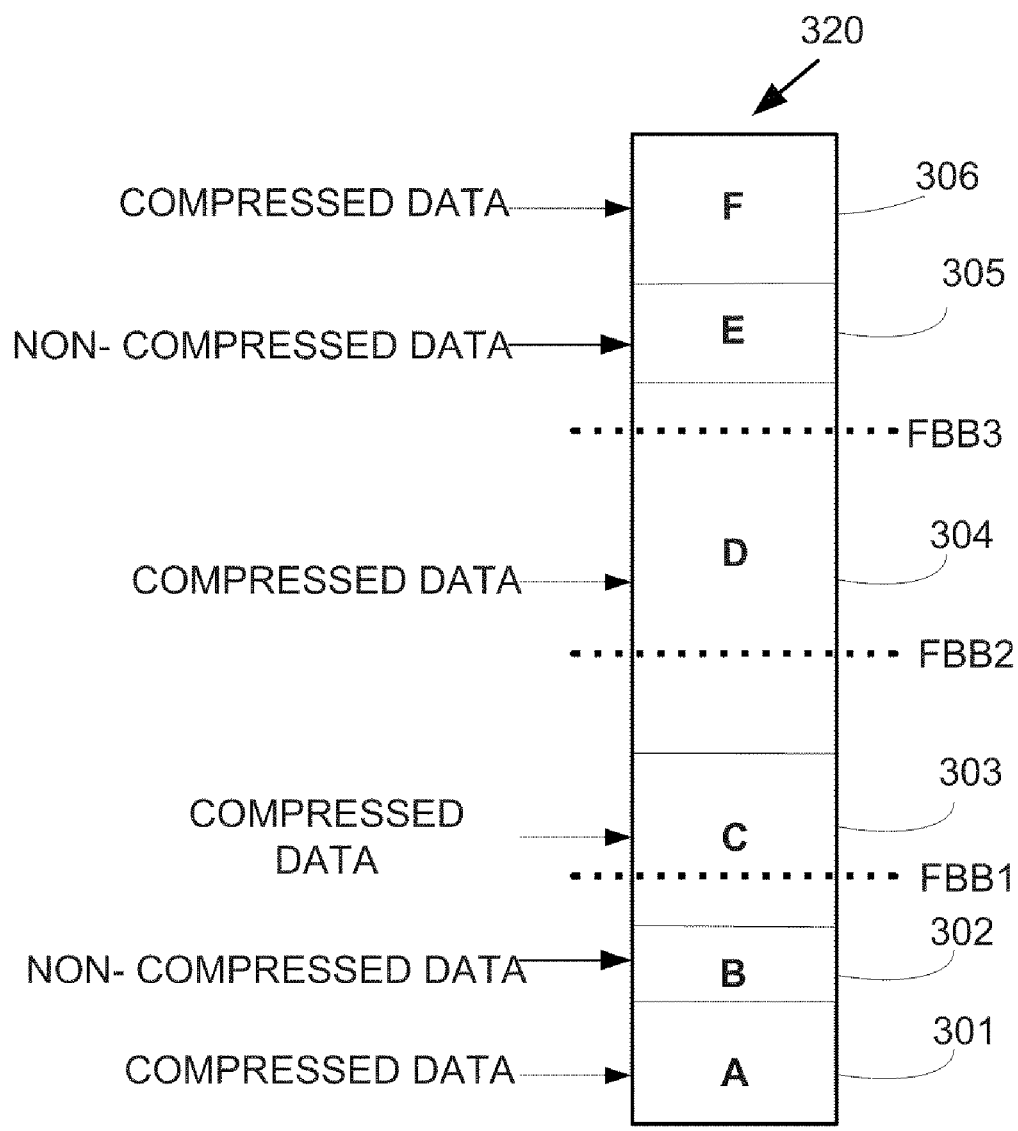
FIG. 3 shows a block diagram of an exemplary compressed memory layout illustrating how blocks of data are typically organized in flash memory.

A compressed ROFS can potentially have many independent regions of compressed data, which are possibly separated by uncompressed data or by padding bytes. This is illustrated in FIG. 3 which is a block diagram of a file system 320 stored in flash memory organized into four regions of compressed data (A, C, D, and F) 301, 303, 304, and 306 respectively, and two regions of raw (non-compressed) data (B and E) 302 and 305 respectively or by padding bytes. These regions of compressed and uncompressed data are stored in four separate flash-block regions delineated in FIG. 3 by flash-block boundaries FBB1, FBB2, and FBB3. Each compressed or uncompressed region of a read-only file system is referred to herein as a "sub-block." Typically a file image is stored as one or more consecutive sub-blocks (A 301 through F 306 as shown in FIG. 3). If the file system is stored in a flash memory, then typically the flash block boundaries do not necessarily coincide with the sub-block boundaries and usually do not do so. Consequently updating data in this configuration posses potential issues, since typically the data in flash blocks are updated in some arbitrary order. For example, in FIG. 3 the second flash block (between FBB1 and FBB2) containing parts of sub-blocks C and D, might be updated in a sequence prior to the third flash block containing just part of sub-block D 304. This might make retrieving the part of D in the third flash block difficult. The reason is that many commonly used compression methods are conditional, meaning that the compression of a particular byte depends on the bytes that have preceded it. Therefore, if the early part of a sub-block is destroyed because it was in an already-updated flash block, it would be difficult to decompress the later part of the sub-block to recover V1 data that is needed for copies.

Similarly, it is difficult to create the later part of a compressed sub-block without creating the early part. This can make creating the final V2 version of a sub-block particularly challenging if the process is to be fault-tolerant. In the above example, if the user has the original data that corresponds in FIG. 3 to the third flash block containing the central part of sub-block D 304, then it would ordinarily be difficult to create the compressed version of the third flash block without first creating the compressed version of the beginning part of D 304 as well.

The earlier described solution to this problem was to modify the images to split any sub-block that crossed a flash-block boundary into two independent parts: one that was entirely within the first flash block, and one that was entirely within the second flash block. This way the conditional coding of any byte that went into one of these sub-blocks never depended on unavailable bytes, such as the header information of each sub-block. This splitting was a permanent change to the images and required greater flash memory to store the new image. However rather than making this change permanent, it only needs to be a temporary image as part of the update, as will be explained.

A simpler solution is to temporarily store otherwise unavailable or unneeded data until it is actually needed. To be able to read a later part of a sub-block in V1 would mean storing the compressed version of the earlier part. For example, in FIG. 3 the update agent 115 could store the initial part of sub-block D 304 (shown in the second flash block adjacent to sub-block C), which would allow it to read the part of D 304 in the third flash block, even if the second flash block was no longer available. To be able to create a later part of a V2 sub-block would mean storing the original (uncompressed) data for the earlier part of that sub-block. For example, in FIG. 3 the update agent could store the raw data for the part of sub-block D 304 in the second flash block, which would allow it to create the compressed version of D 304, even if the update agent had not yet updated the second flash block.

While this is possible, it turns out that it requires significantly extra storage space in flash memory that often may not be available: Fortunately, some popular conditional coders do not need all of the previous data bytes to compress and decompress the current bytes. This allows the update agent to instead store just the necessary bytes, which leads to a significant reduction in storage requirements. Similarly, other kinds of conditional coders might not need all the bytes, but only a limited amount of information from them which would take up less room than the bytes themselves. This necessary information required to restart compression or decompression from a particular point is called the compressor/decompressor state. The data compressor used in the preferred embodiment of the present invention (zlib) already has this state information in an accessible form, and provides the capability to stop and resume compression or decompression from these states alone. [The under-lying compression algorithm, "zlib," was created by Jean-loup Gailly and Mark Adler (see http://www.zlib.net) and is a well-known general purpose lossless data-compression library.] zlib is an instance of the well known LZ77 compression algorithm. The information that LZ77 needs to start decompressing from a particular point in a compressed stream, i.e., the decompressor state, consists mainly of some of the decompressed bytes before that point in the data. It should also be noted that frequently device 107 will employ several file systems each of which may be compressed using different compression algorithms. In such an event the generator may need to explicitly indicate to the agent 115 which regions of the original and updated images use which compression methods. Agent 115 would then know how to decompress and recompress each of those regions of the image. Otherwise the following description is the same for such electronic devices.

In the discussion of the preferred update process that follows, broadly speaking, the update process is divided into two different phases. In the initial phase the update agent 115 creates an intermediate or temporary representation of the updated V2 data image and writes that intermediate representation back to flash memory 111 overwriting only the original data that was updated. In the second or final phase the update agent 115 converts the intermediate representation into its final form and then writes that back to flash memory 111 again overwriting the previous representation of that data. Having two separate phases in the update makes the implementation of the solution easier, may provide good tradeoffs in the use of computational resources, and more importantly is completely fault tolerant.

Phase 1 Update

Figure 4:
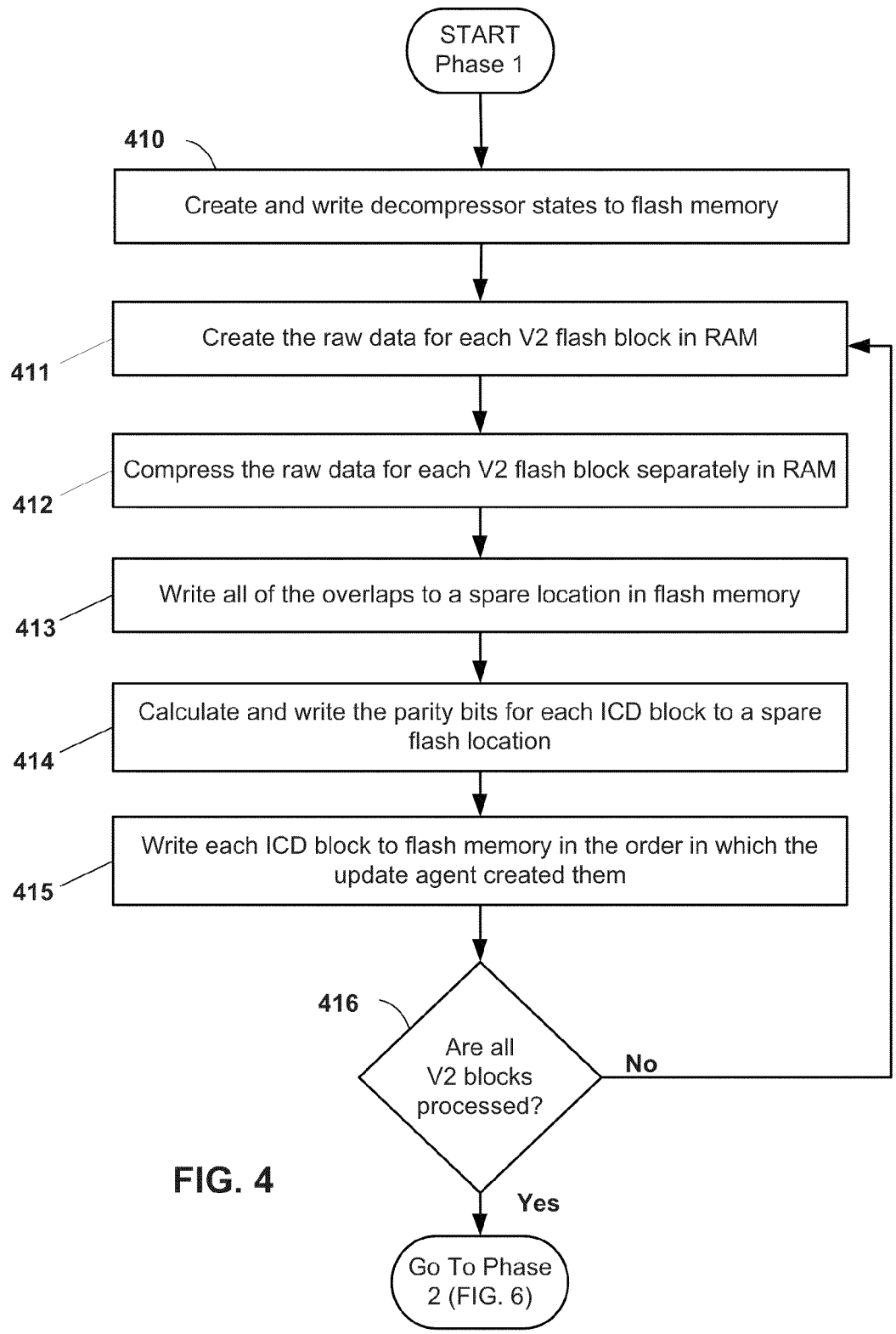
FIG. 4 is an operational flowchart that illustrates an exemplary method of processing a first memory image comprising a plurality of compressed sub-blocks and uncompressed sub-blocks to produce an intermediate memory image comprising an updated first memory image arranged as a plurality of independently compressed memory blocks, in accordance with a representative embodiment of the present invention.

In accordance with a representative embodiment of the present invention, FIG. 4 shows a flowchart for an exemplary method of processing and updating a first memory image which consists of a plurality of memory blocks. The memory blocks themselves are further organized as compressed and uncompressed sub-blocks. Our process produces a second memory image comprising the contents of the first memory image updated in accordance with an update package and arranged as another plurality of memory blocks.

In the following discussion of the update process we have assumed that much if not all of the data in the original version of the data (V1) will be modified. This, however, is not the usual situation and is not at all a requirement of the approach taken herein. The basic process will work for any type of update as will be seen. V1 flash block boundaries (shown in FIG. 3) are identified in the update package 116 where a decompressor state is required to perform an update. In other words if a particular update only needs, for example, the data in 10 particular flash blocks out of 1000 in the image, then the update agent does not necessarily need to go through the entire V1 image in memory 111 and decompress everything in RAM 165 just to get the decompression state for those 10 flash blocks. So for purposes of this explanation, we assume that the update package 116 identifies which data blocks in V1 are needed for the particular update which is typical of commercial updates of software. In addition a decompression state for a flash block is not needed if the V1 image data in that flash block is not used at all in the V2 version. It may also happen that the earlier parts of the sub-block that crosses into a given flash block B lie in flash blocks that are still in their V1 state. Then a decompression state is not needed at the beginning of flash block B, since the update agent could start reading the sub-block from its beginning. Finally, a decompression state is not needed if the compressed sub-block does not change at all from V1 to V2 since then the agent can simply copy this compressed sub-block to the V2 image without decompressing it at all. Copying unchanged compressed sub-blocks into V2 directly is also useful because it may speed up the update.

Referring to FIG. 4 the first step 410 in the process is for update agent 115 to decompress each compressed sub-block in V1 that crosses these identified flash block boundaries (e.g., sub-blocks 303 and 304 in FIG. 3). At exactly each identified flash block boundary, the update agent 115 notes the V1 decompressor state and writes that information to a spare region in flash memory 111. The update agent may delay writing a state to flash memory until it has accumulated enough data to fill an entire flash block. (Again the purpose for keeping track of the decompressor states is so that the update agent can resume decompressing from any point in the update process even when the previous flash block is no longer available.)

When the decompressor states of the needed flash blocks have been written to a spare region in flash memory 111, the update agent 115 (at step 411) can begin to generate the updated version of the data (V2) flash blocks in an uncompressed format. The update agent 115 uses the raw data in V1 only when needed and applies the predetermined updating instructions in the update package 116 to create the raw data for each V2 flash block. The resulting V2 flash blocks are consecutively written in uncompressed format to RAM 165. This uncompressed data does not contain any information about the file system structure, and the data from all of the sub-blocks in the flash blocks are concatenated together at this stage. It also should be noted that the order in which the flash blocks are created in RAM is in general probably not consecutive from the beginning to the end of the image. For example, if there were only ten flash blocks, numbered from 1 to 10, for reasons having to do with efficiency of the update process itself, it may be that the best update order sequence is {7, 2, 4, 1, 8, 3, 6, 9, 5, 10} rather than consecutively ordered as {1, 2, 3, 4, 5, 6, 7, 8, 9, 10}. This order is determined by a component of the generator called the order manager (not shown).

Figure 5:
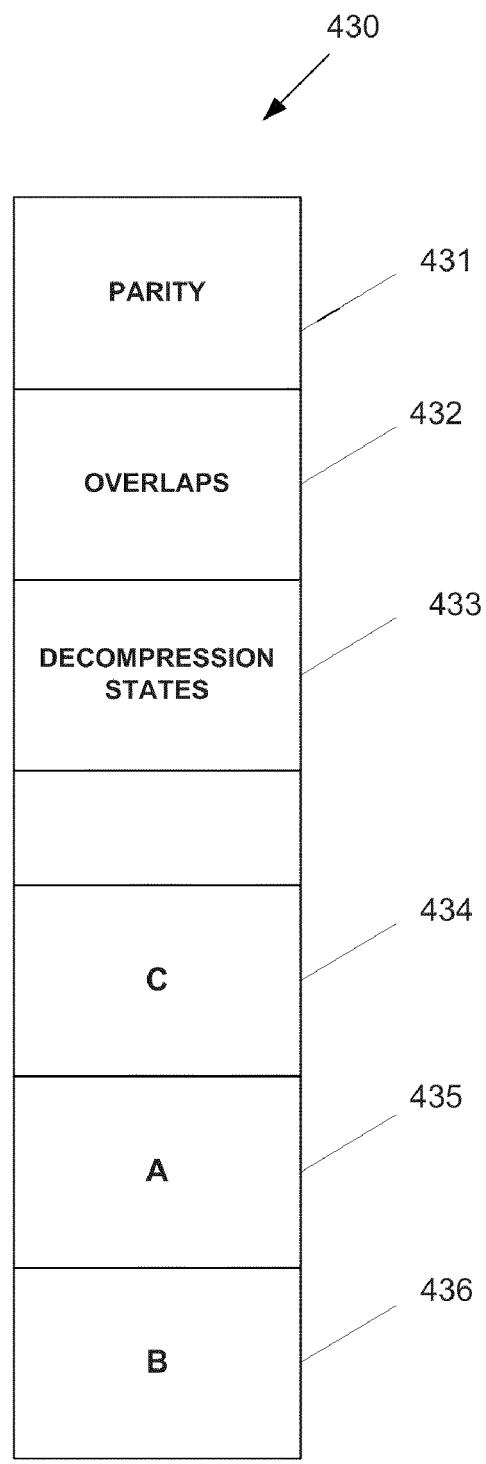
FIG. 5 shows a block diagram illustrating generally the organization of sub-blocks of memory after decompression and recompression, in accordance with a representative embodiment of the present invention.

After all the V2 flash blocks in uncompressed form are processed in RAM 165, update agent 115 (at step 412) compresses the raw data generated at step 411. However, the raw data in each flash block is compressed independently of every other flash block. By doing this the update agent 115 can easily decompress that data later in the process when needed without needing to access adjacent data blocks. We call one flash block's worth of data compressed this way as the "ICD" (Independently Compressed Data) form or format of the V2 flash block. The advantage of having the ICD available is that when we overwrite the original V1 data in flash memory, we will be able to read the data even in the event of a system failure occurring during the overwriting of V1. The only complication is that when the data for a flash block is compressed independently from every other flash block, the intermediate ICD blocks generally consist of more data bytes than the original flash block with the result being that there is excess data relative to the original flash block. (This is especially true where NAND flash devices are used.) Therefore, in order to ensure fault tolerance, when the system begins overwriting V1 data, care is taken to overwrite the original flash blocks only after the excess data has been written to an alternate flash location. The reason for this one-to-one correspondence will become clear as the rest of the process is explained. For reference purposes the amount of excess data bytes generated during the creation of the ICD blocks is referred to herein as the "overlap" and is shown in FIG. 5 as a separate data block 432. This overlap information must be kept available for the update agent to fully recover all the data in the ICD blocks when writing back the final version of V2 in the desired compressed format. And for obvious reasons the update agent 115 maintains the same scrambled sequence of the flash blocks. (Although it would be possible to reorder the flash blocks, recompress them while in RAM 165, and write the final version to flash memory 111, any system failure occurring during the write process of those compressed blocks to flash memory 111 would destroy the original V1 data making a normal recovery impossible. To maintain a tolerance for system failures, we continue with the following steps.)

At step 413 the update agent 115 causes all of the overlaps just created to be written to another spare/buffer location in flash memory 111. Since each overlap byte is associated with a particular ICD block, we must have a way of linking them to particular ICD blocks. In the preferred embodiment the generator sends the update agent 115 a table that indicates where to store each overlap data byte in flash memory. It is actually not necessary to specify the location of every overlap byte if they are stored consecutively, since they are only retrieved consecutively. But even in this case, if the update agent 115 were to store the overlap bytes in several different flash blocks, then at least the locations of those flash blocks should be kept in a table from the generator so that they could be retrieved for processing in the final phase of the update process explained below.

At step 414 the update agent 115 performs a bitwise exclusive-OR of all the ICD blocks plus the previous group's last stored overlap block (where grouping exists), and writes the resulting parity block to another spare flash block. (This is done to aid in recovering corrupted blocks of data, if needed, which is also discussed below in connection with the recovery phase.)

At step 415 the update agent 115 writes the ICD blocks back to flash memory in the order in which the update agent created them and in so doing overwrites the original V1 data blocks that were updated. FIG. 5 is an illustration of how the flash memory 111 might be arranged after step 415 with just three ICD blocks A (435), B (436), and C (434) along with the overhead data needed to reconstruct these blocks (parity block 431, overlap regions 432, and the decompression states 433). Although the size of each region (431-436) is shown approximately the same, this is just for purposes of illustrating the structure of the flash memory, and in general, the regions would not be the same size, nor certainly limited to just three ICD blocks (A, B, and C).

At step 416 the update agent 115 counts the updated data blocks to determine whether all the V2 blocks have been processed. If not, the previous steps 411-415 are repeated until all the ICD flash blocks have been created and written to memory 111. (If a particular update processes the data blocks in groups, which is discussed below, then steps 411-415 would be repeated for each group of data blocks.) Upon completion of writing all the ICD blocks to memory, we have completed Phase 1 and have a complete intermediate memory image of the V2 blocks broken up into ICD blocks and overlap blocks. The intermediate memory image is simply not in the final compressed form needed for an efficient running of device 107.

Phase 1 updating of the required data blocks in memory requires that there be enough RAM capacity to process and keep their V2 ICD versions available until after the parity block is written. Yet, the amount of available RAM 165 necessary to update all changed V2 blocks may not be sufficient in all cases particularly since the data blocks are being created in an uncompressed format and since all devices 107 do not have the same RAM capacity. Therefore, in cases where the available capacity in RAM 165 is insufficient to recreate and temporarily store all of the updated V2 flash blocks, an alternative is to have the update agent 115 split the update into a number of independent groups of flash blocks. By grouping the update into a limited number of flash blocks taken together in RAM 165 before committing them back to flash memory, we limit the size of a buffer needed for any particular update. For example, the first 20 flash blocks (in the order from the order manager) might be updated first, then the next 20, and so on. By initially sizing the amount of storage that will be required by a particular update, the update agent 115 can determine from the beginning of the update whether such grouping will be required in any particular update. But if the update agent 115 decides that grouping is needed, it would have to write several parity blocks, one before writing each group. Then after the parity block gets written to flash memory 111, the group could be written, and then the buffer would be available for the next group. When an update begins, the update agent 115 may calculate the number of blocks in a group using known and constant quantities, such as the size of memory that it has available and the size of a flash block. If later, the agent needs to do a fault-tolerant recovery, it may repeat this calculation to help it determine the group in which the corrupted flash block occurred.

Phase 2 Update

Figure 6:
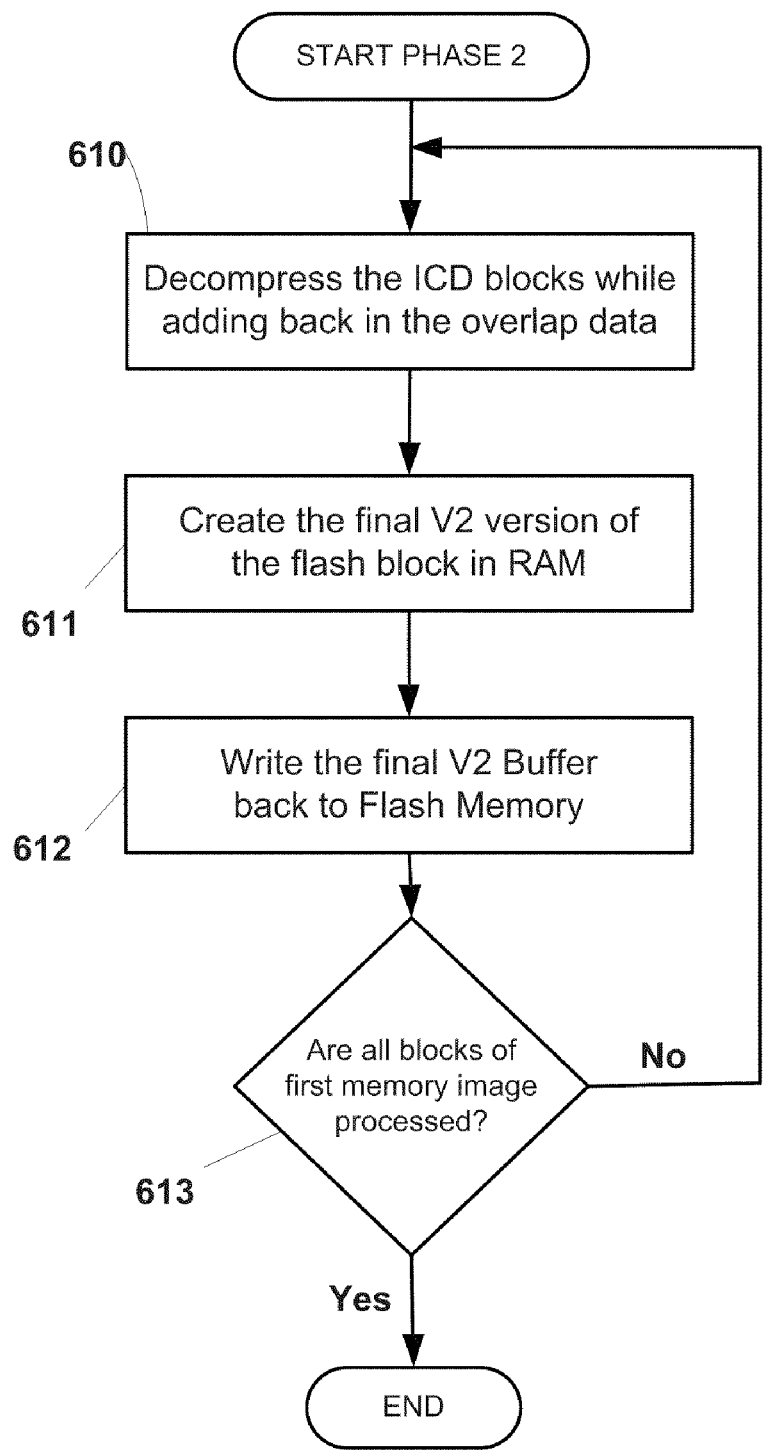
FIG. 6 shows a flowchart for an exemplary method of processing the intermediate memory image to produce the final version in compressed format of the updated memory image in accordance with a representative embodiment of the present invention.

In the second phase of the preferred process, we need to create the final memory image in the desired compressed format. Update agent 115 creates the final V2 form of each flash block using both the stored ICD blocks (434, 435, and 436) and the overhead data (431, 432, and 433) all of which are depicted in FIG. 5. The update agent 115 creates these final V2 flash blocks consecutively from the beginning to the end of each flash block. For each flash block it repeats the following steps illustrated only generally in FIG. 6.

At step 610 we consecutively copy and decompress each ICD block stored in flash memory (that is associated with the particular update), while adding back in any overlap data 432 associated with that particular data block. At step 611 the uncompressed flash block is temporarily stored in an open buffer location in RAM 165. In this step the update agent 115 creates the final V2 form of each flash block whose raw data is stored in the buffer using patch instructions from the update package 116. The patch instructions basically indicate how to create sub-blocks that are either compressed or that are already in an uncompressed (raw) format. If compressed, the patch instructions indicate how many raw bytes to read from the unused part of the data (from step 610), and then to compress that data as a unit and store the result back in another RAM buffer location where the new V2 flash block is being assembled. Or if the sub-block data is not compressed, the patch instructions indicate how many bytes to merely copy from the unused part of the data block from step 610 directly into the final V2 RAM buffer area.

And finally at step 612 the final version V2 of each flash block is written back to flash memory to over-write the corresponding ICD blocks stored in flash memory 111. However, as noted above, compressed sub-blocks often cross flash block boundaries. When the update agent 115 first detects the beginning of such a sub-block, it decompresses the required next ICD blocks and stores the uncompressed data in a buffer. Then the update agent 115 compresses all of the data in that buffer for that sub-block in one pass. Then, at step 611 for the remaining flash blocks, the update agent 115 simply copies any remaining compressed data into the final V2 buffer for that flash block.

At step 613 the update agent 165 tests to determine if all the ICD blocks have been processed. If not, these three steps (610-612) are repeated until all the flash blocks have been updated and written to flash memory. When all the flash blocks are updated, the process is complete, and all of the overhead data in (431, 432, and 433) is purged.

System Recovery

As is indicated above it is a requirement that this entire updating process be fault tolerant. Therefore there needs to be a consistent and reliable recovery method in the event of a power failure or other unplanned system interrupt during a system update. There are two places where a corruption of data could take place that could cause a problem in continuing with an update: during the middle of a Phase 1 update or during the middle of a Phase 2 update. To illustrate the recovery process assume first that the system update stopped during the middle of the Phase 1 update shown in FIG. 4, i.e., somewhere during steps 413, 414, or 415. Once power is restored to the host device 107, the update agent 115 goes into a recovery mode and follows the recovery steps, shown in FIG. 7, which are similar to those for recovering from failures in ordinary firmware updates.

Figure 7:
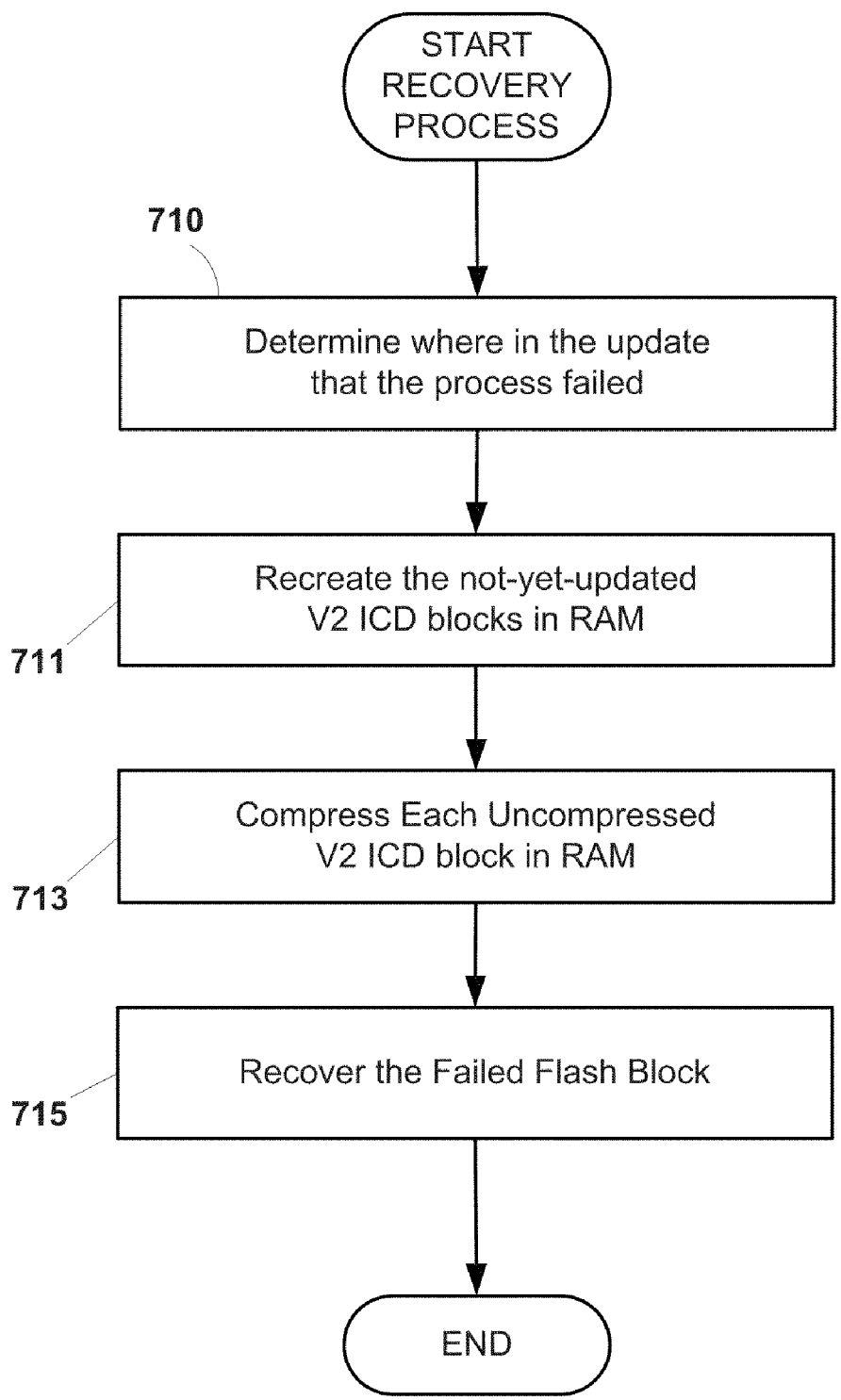
FIG. 7 is a flowchart showing how an exemplary recovery process would be implemented after a system shutdown that occurred during phase 1 of an update in accordance with a representative embodiment of the present invention.
Figure 8:
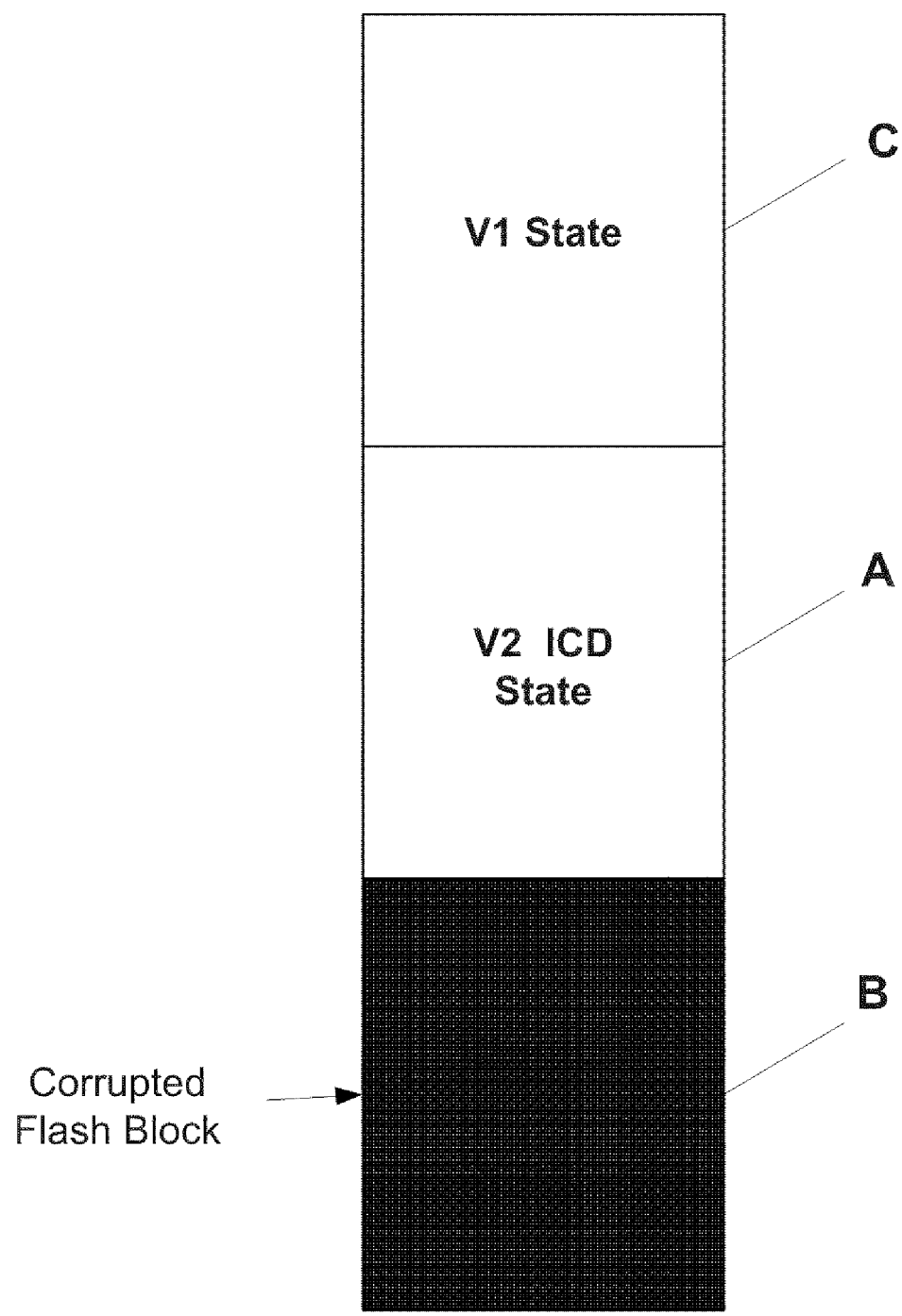
FIG. 8 shows a very small portion of a memory image that had been partially updated and corrupted during a system shutdown/power failure during the initial phase of an update of the memory image in accordance with a representative embodiment of the present invention.

Referring to FIG. 7 at step 710 the update agent 115 has to determine where the update stopped at the instant of the system failure. It does this by comparing the checksums of each flash block (stored in flash memory at step 414 in FIG. 4) to the checksums stored in the update package for each flash block. (The update package 116 has checksums for the data in each flash block both in its original V1 state, and in its V2 ICD state. If the checksum of the data in an actual flash block in flash memory 111 does not match either of the precalculated checksums for it, then that flash block has to be corrupted.) FIG. 8 illustrates very generally a failure situation where the update agent 115 has updated only part of flash block B when the crash occurred. In this simple example flash block A is shown updated to the ICD V2 state, but flash block C had not been updated at all and is still in the original (unaltered) V1 state. In this example we assume that the power failure occurred while the ICD data in data block B was being written causing a corruption of flash block B. The update agent can detect this since the checksum of the bytes in this flash block would not match either checksum stored in the update package 116. (It is possible that all of the flash blocks are either still in their initial V1 state, or in the final V2 ICD state, but in either of those situations, the recovery is trivial since update agent 115 would simply resume the update from where it left off, i.e., none of the data stored in flash memory was corrupted.) Otherwise the update agent has to recover the original data in the corrupted flash block B using the following steps.

Referring again to FIG. 7, at step 711, we have to regenerate the not-yet-updated V2 ICD flash blocks in RAM 165. The update agent 115 is able to recreate this data, because the generator ensured that the copies necessary to reconstruct a V2 ICD block come only from the compressed V1 block originally stored in that same location in the non-volatile memory 111, or from the not-yet-updated (according to the order manager) V1 blocks also in the non-volatile memory 111.

At step 713 in FIG. 7 the update agent 1.15 simply compresses each uncompressed V2 block in RAM 165 using the same ICD format as for Phase 1 processing. To recover the corrupted flash block, step 715, the update agent 115 calculates the exclusive-OR of the parity block, all of the not-yet-written V2 ICD blocks, and all of the already written V2 ICD blocks (which the update agent has just sequentially read into RAM 165). The result of the calculation is the ICD data bytes for the corrupted block B. Once the recovered block is saved to flash memory as a next step, the update process has fully recovered from the system failure. At that point the normal Phase 1 update shown in FIG. 4 can continue from the point of the restored flash block.

Figure 9:
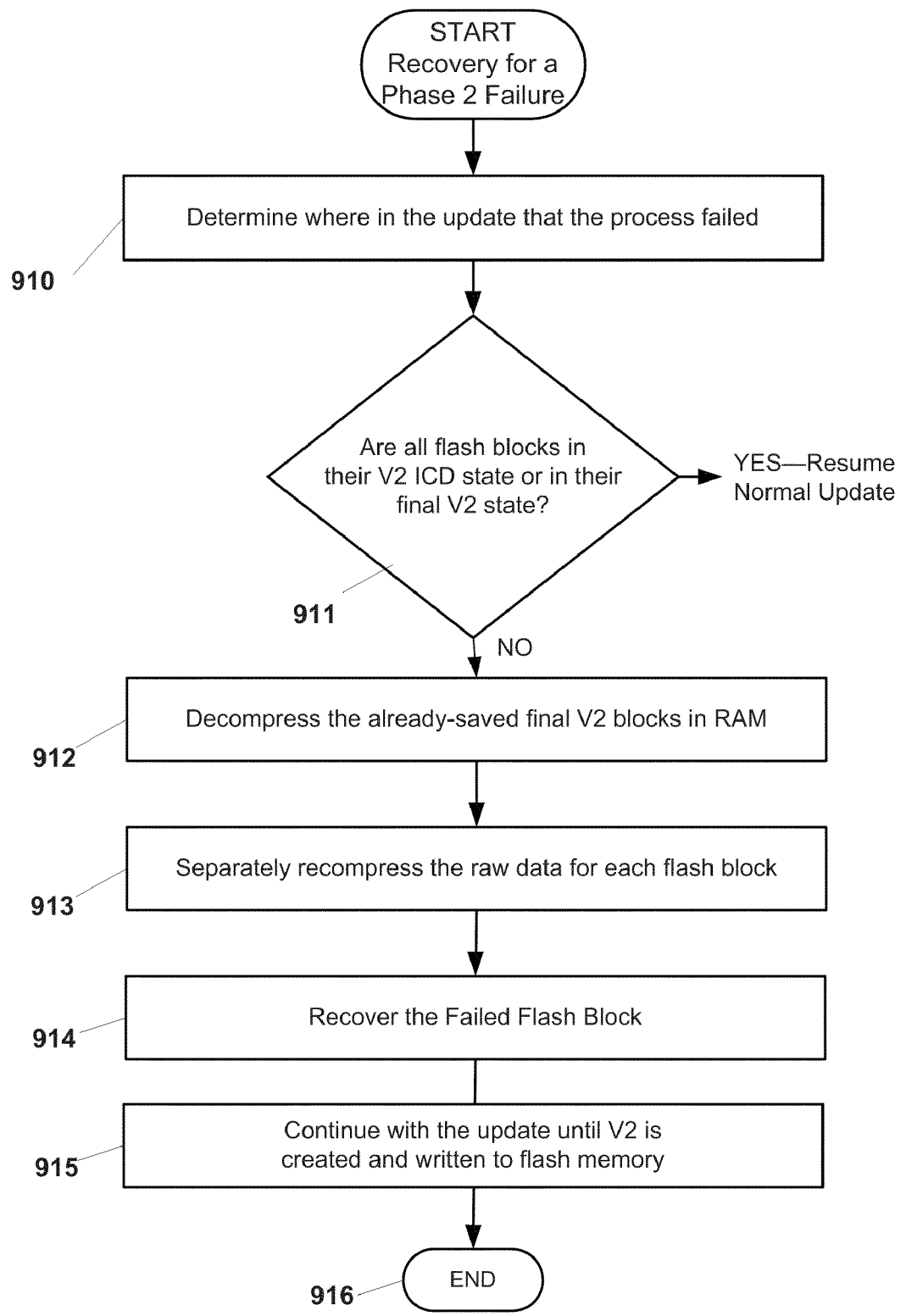
FIG. 9 shows another flowchart showing how an exemplary recovery process would be implemented after a system shutdown that occurred during phase 2 of an update of the memory image in accordance with a representative embodiment of the present invention.

To further illustrate the recovery process, suppose that the system failed in the middle of a Phase 2 update. Once power is restored to host device 107, update agent 115 determines that the failure occurred during the second phase of the update. To recover from a Phase 2 interrupt, update agent 115 follows the recovery steps shown in FIG. 9. The first logical step is to determine the point at which the update process had failed (step 910) right before the system failure. It does this by comparing the checksum of each flash block to the corresponding checksums stored in the update package (step 911). It is possible that all the flash blocks are either in their V2 ICD state or in their final V2 state so that all the checksums match up. In that situation update agent 115 simply resumes the normal update from where it left off, since none of the data was corrupted. But if the checksums do not match up, it recovers the one corrupt flash block using the following steps.

Again referring to FIG. 9 at step 912 the update agent 115 decompresses the already-saved final V2 block to produce the raw/uncompressed flash block where the update process had failed at the time of the system failure. However, it is quite possible that the process failed at a point where a compressed sub-block crossed from one flash block to another (as shown in FIG. 3). Most standard decompression methods are able to decompress from the beginning of such a sub-block without having access to the entire sub-block. This allows the update agent 115 to get the data from these partial sub-blocks even when the remainder of the data bytes lie in a corrupted flash block.

Another issue that may occur during a recovery is when a V2 sub-block appears to be compressed, but in reality is not. This occurs when the sub-block is decompressible, but there is no way to recompress it, so that it is bit-for-bit identical to the original version of the sub-block. To handle this situation, when the generator notices such a decompressible sub-block, the generator produces a patch command to treat that sub-block as a raw sub-block rather than as a compressed one. Then during step 912 in FIG. 9 in the recovery process, the update agent 115 can use these patch commands to help guide decompression. In this case the patch commands indicate that the update agent should not attempt to decompress sub-blocks that cannot be recompressed successfully.

Having decompressed the already-saved final V2 block to produce the raw/uncompressed flash blocks, at step 913 we separately recompress the raw data for each flash block and store it in RAM. This produces the ICD form of each V2 flash block. At step 914 we recover the failed flash block by calculating: the exclusive-OR of a) the parity block, b) all of the ICD versions of the already written V2 blocks from step 913, and c) all of the ICD V2 blocks still stored in flash. Because of the way the update agent 115 had calculated the parity block, this produces the corrupted V2 flash block. At step 915 we continue with the update. Update agent 115 does not necessarily have to first write the ICD version of the corrupted block to flash, since the update agent 115 could simply resume the update from RAM 165 at this point.

Figure 10:
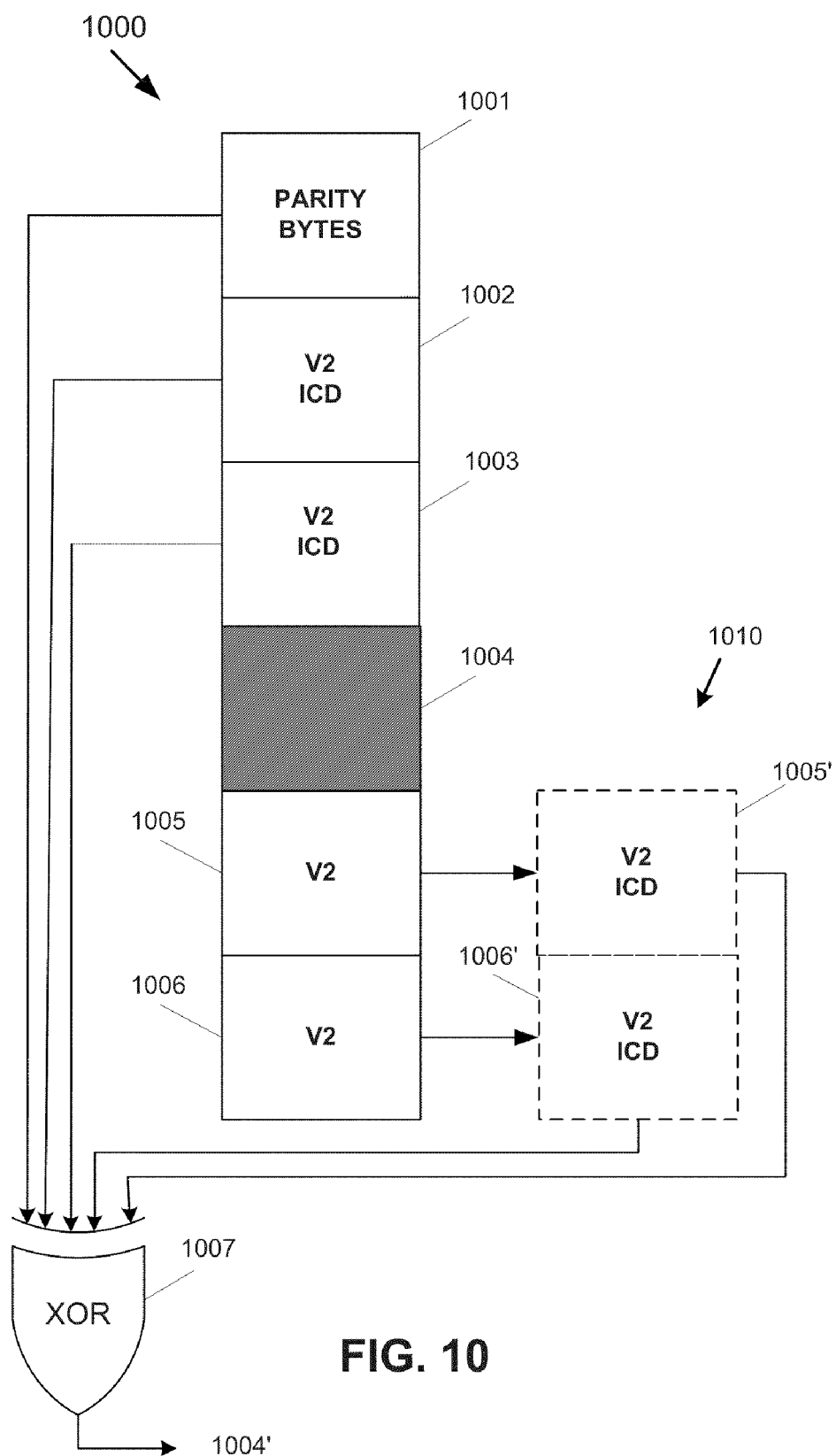
FIG. 10 is a schematic diagram illustrating what occurs to typical data blocks where one of the blocks has been corrupted during phase 2 of an update of the memory image in accordance with a representative embodiment of the present invention.

To better illustrate what occurs to recover a corrupted data block during a Phase 2 recovery, consider data blocks 1000 shown in FIG. 10. This is a schematic diagram illustrating what occurs to the data blocks 1001-1006 during a recovery. During the update in this example, data blocks 1002 and 1003 were successfully converted to the updated version V2 in ICD format. (Note that the parity block, shown as block 1001 would not usually appear adjacent to the other data blocks, but for convenience is shown in this manner.) And data blocks 1005 and 1006 were successfully converted to the updated V2 version, whereas data block 1004 has been corrupted during the system failure. Therefore, the data in block 1004 is no longer present in RAM. To recover the corrupted data once power is successfully restored, update agent 115 would create data blocks 1005' and 1006' which is the ICD version of the first two flash blocks 1005 and 1006. Then the update agent would calculate the bitwise exclusive-OR (shown schematically as XOR gate 1007) of these together with the last two flash blocks 1002 and 1003 along with the parity block information 1001. This will recreate the missing block 1004' at the output of gate 1007, since $1001 \oplus 1006' \oplus 1005' \oplus 1002 \oplus 1003 = 1004'$.

Recovery of Overlap Data

Figure 11:
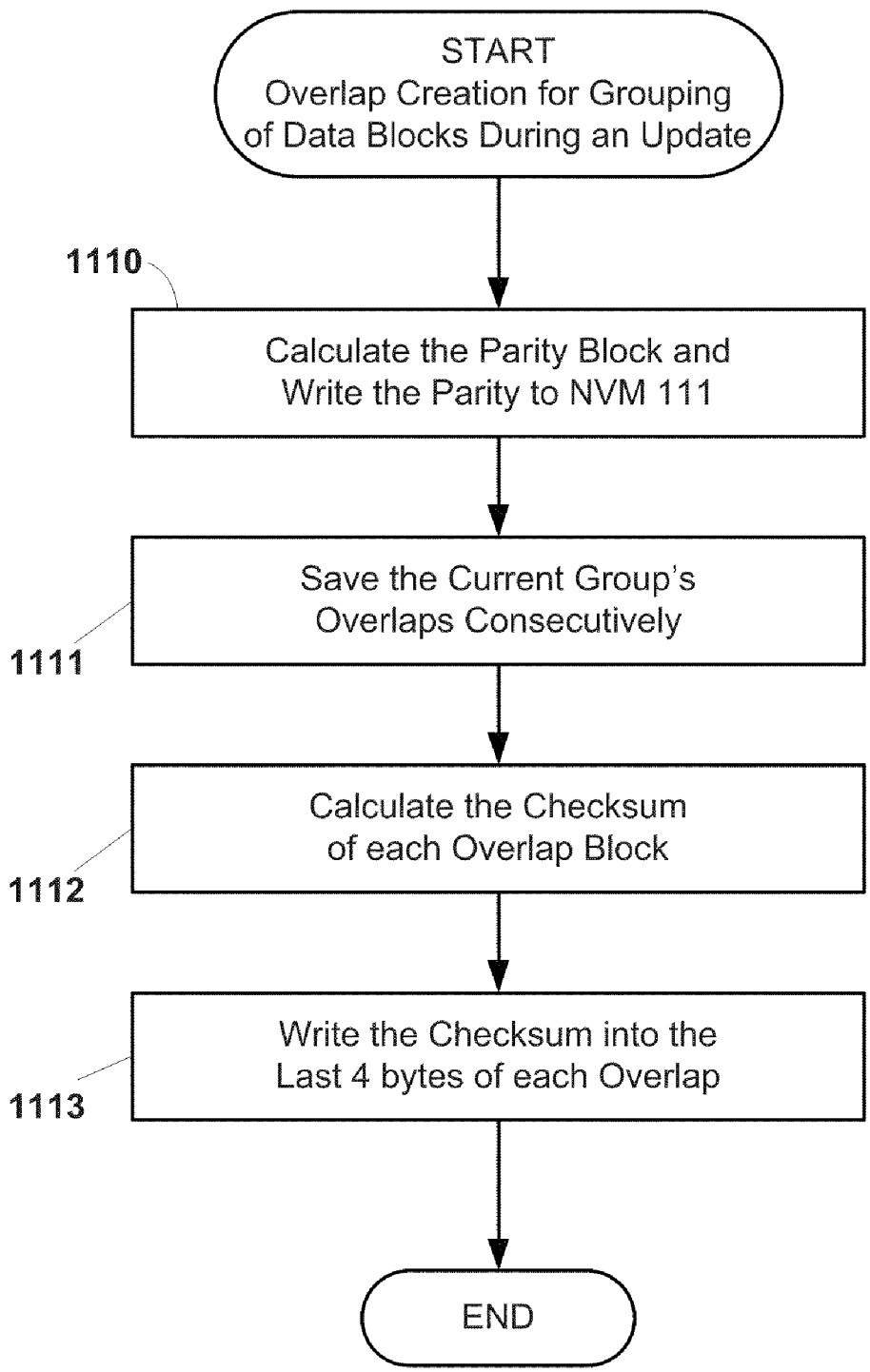
FIG. 11 is a flowchart of an exemplary process showing how the overlap blocks are created if grouping of data blocks is employed to minimize the size of RAM needed to handle an update in accordance with a representative embodiment of the present invention.

Another side effect of grouping the data blocks during an update is that it makes recovery while the update agent 115 is writing overlap data more complicated. The problem arises because a single flash block can contain overlap data from more than one group, so if the overlap block is corrupted, the previous group's overlap data (which update agent 115 needs for Phase 2 of the update) are permanently lost. There is no way to recover the overlap data since the data to create the previous group's V2 ICD blocks no longer exists. To solve this situation the update agent 115 calculates the parity block differently in the event of grouping during an update. This method is illustrated generally in FIG. 11 where, at step 1110 the update agent 115 calculates the parity block from both the current group of ICD flash blocks and from the overlap block of the previous group. The update agent 115 then writes this new parity block to flash memory 111.

At step 1111 update agent 115 writes the overlap data bytes of the current group consecutively into the flash blocks as usual. Then at step 1112 update agent 115 calculates the checksum of each overlap block in the group. At step 1113 update agent 115 writes the checksum into the last four bytes of each overlap block. The update agent skips over these bytes when it fills the overlap data blocks.

During a recovery the update agent 115 determines whether it had written any ICD flash blocks in the current group. If that test is positive, the overlaps from the current group and parity bytes must already be safely stored in a flash memory block, and the update agent 115 continues with the update normally. But if that test is negative, the update agent 115 checks whether the last overlap block from the previous group is corrupted using the checksum in that block to make such a determination. If it is not corrupted, then the update agent 115 starts to update the overlap and ICD blocks from the current group. If the last overlap block from the previous group is corrupted, then the update agent 115 recovers this overlap block using the current group's parity block, which must already be in flash memory. Then the update agent starts to update the current group.

Additional aspects of the present invention may be seen in a computer-readable memory device having stored therein a plurality of instructions for causing a processor to perform the method described above.

Accordingly, a representative embodiment of the present invention may be realized in hardware, software, or a combination of hardware and software. Representative embodiments of the present invention may be realized in a centralized fashion in at least one computer system or in a distributed fashion where different elements are spread across several interconnected computer systems. Any kind of computer system or other apparatus adapted for carrying out the methods described herein is suited. A combination of hardware and software may be a general-purpose computer system with a computer program that, when being loaded and executed, controls the computer system such that it carries out the methods described herein.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A fault-tolerant method of updating an original data image having both compressed and raw data arranged into data sub-blocks and stored in a programmable non-volatile flash memory, wherein the flash memory is divided into discrete flash blocks with flash block boundaries, the method comprising:

a) decompressing each compressed data sub-block identified by predetermined updating instructions;
b) generating the decompression state for each decompressed data sub-block that crosses a flash block boundary, and copying to flash memory the generated decompression states for use in recovering data after a system failure;
c) creating an intermediate memory image in buffer memory by
   i. applying predetermined updating instructions while retrieving and decompressing flash blocks of data identified by the predetermined updating instructions and creating an intermediate memory image consisting of a sequence of uncompressed data blocks, each corresponding to a single flash block;
   ii. compressing the intermediate memory image so that the data in each flash block is compressed independently of the data in any other compressed flash block;
   iii. over-writing the flash blocks in the original data image with the intermediate memory image;
d) creating an updated memory image that includes the desired update information by
   i. copying portions of the intermediate memory image to a buffer and decompressing the data in each compressed flash block in the intermediate memory image;
   ii. sequentially recompressing the decompressed intermediate memory image into discrete flash blocks thereby generating the updated compressed memory image; and
   iii. overwriting the intermediate memory image in the flash memory with the updated compressed memory image.

2. The updating method according to claim 1, wherein step (c)(ii) further comprises:
limiting the amount of data associated with each discrete flash block in the intermediate memory image so that each independently compressed data flash block is no larger than the size of the corresponding data flash block in the original data image thereby creating overlap data for each compressed flash block; and
storing in flash memory the overlap data generated from the above step.

3. The updating method according to claim 2, where step (d)(i) further comprises:
selectively combining the overlap data with the decompressed intermediate memory image data to generate the updated memory image in uncompressed format.

4. The updating method according to claim 3 further comprising:
after step (c)(ii), calculating the parity block for all of the independently compressed data blocks and copying the parity block to the flash memory for use in recovering data after a system failure.

5. The method according to claim 3, wherein steps (c)(i), (c)(ii), and (c)(iii) further comprise:
e) applying predetermined updating instructions while retrieving and decompressing a first group of flash blocks of data identified by the predetermined updating instructions and creating a partial intermediate memory image in uncompressed format;
f) compressing the partial intermediate memory image so that the data for each flash block is compressed independently of the data in any other flash block;
g) over-writing the data flash blocks in the original data image with the partial intermediate memory image; and h) repeating steps (e), (f), and (g) sequentially until all of the flash blocks of data identified by the predetermined updating instructions have been processed thereby creating the intermediate memory image.

6. The updating method according to claim 4 wherein the original data image comprises a read-only file system.

7. The updating method according to claim 4 wherein in the event of a power failure occurring while creating the intermediate memory image, upon restoration of power, performing the steps of:

locating the point of failure in the update process by comparing the checksums of each data flash block in the intermediate memory image stored in the flash memory to the checksums stored in the update package for each data flash block;

if all of the data flash blocks are in an unmodified state, continuing with all the remaining steps in the updating process beginning at step (c) (i);

if all of the data flash blocks in the original data image have been over-written with the intermediate memory image, continuing with all the remaining steps in the updating process beginning at step (d) (i);

if neither of the above steps is valid, performing the following steps to recover corrupted data and continue the updating process:

for that portion of the original data image that had not been updated before the power failure, applying the updating instructions while retrieving and decompressing flash blocks of data identified by the predetermined updating instructions and creating a portion of the intermediate memory image in uncompressed format;

recompressing that portion of the intermediate memory image from the prior step so that each data flash block is compressed independently of any other compressed data flash block;

copying to the buffer memory the remaining portion of the intermediate memory image from the flash memory that had been updated;

calculating the exclusive-OR of the parity block and all of the compressed data blocks from the prior two steps thereby generating the original data in the corrupted data block; and continuing with each of the remaining steps in the updating process beginning at (c) (iii).

8. A mobile electronic device having an operating software system configured to have a completely fault-tolerant process for updating the operating system software, said electronic device comprising:

a buffer memory;

a computer-readable flash memory having stored therein said operating system software configured as a first memory image consisting of compressed and incompressible blocks of data, and divided into discrete flash blocks of data;

a processor programmed for updating the first memory image in accordance with predetermined updating instructions by:

decompressing each compressed data sub-block identified by the predetermined updating instructions;

generating the decompression state of each decompressed data sub-block which crosses a flash block boundary and copying to flash memory the generated decompression states for use in recovering data after a system failure;

creating an intermediate memory image in buffer memory by applying the predetermined updating instructions while retrieving and decompressing flash blocks of data from the flash memory identified by the predetermined updating instructions and creating an intermediate memory image consisting of a sequence of uncompressed data blocks, each corresponding to a single flash block;

compressing the intermediate memory image so that the data corresponding to each flash block is compressed independently of the data in any other flash block, and limiting the amount of data in each discrete flash block in the intermediate memory image so that each independently compressed flash block fits within the corresponding flash block, and if it does not, saving the overlap data to flash memory;

over-writing the data in each flash block in the original data image with the intermediate memory image;

creating an updated memory image that includes the desired update information by copying the intermediate memory image to the buffer and decompressing each compressed data sub-block in the intermediate memory image while using the overlap data stored in flash memory;

sequentially recompressing the decompressed intermediate memory image into a different sequence of data sub-blocks thereby generating the updated compressed memory image; and overwriting the intermediate memory image in the flash memory with the updated compressed memory image.

9. The mobile electronic device according to claim 8, wherein said device further comprises a cellular phone.

* * * * *

UNITED STATES PATENT AND TRADEMARK OFFICE
CERTIFICATE OF CORRECTION

| | |
|---|---|
| PATENT NO. | : 8,201,054 B2 |
| APPLICATION NO. | : 12/509184 |
| DATED | : June 12, 2012 |
| INVENTOR(S) | : Marko Slyz et al. |

It is certified that error appears in the above-identified patent and that said Letters Patent is hereby corrected as shown below:

In column 16, line 45, in Claim 3, delete "where" and insert -- wherein --, therefor.

In column 17, lines 46-47, in Claim 8, delete "operating software system" and insert -- operating system software --, therefor.

Signed and Sealed this
Eighteenth Day of December, 2012

David J. Kappos
*Director of the United States Patent and Trademark Office*